(No Model.)
5 Sheets—Sheet 1.

C. H. CURTIS.
FRUIT SIZER AND GRADER.

No. 439,932. Patented Nov. 4, 1890.

Witnesses:
Chas. E. Gaylord.
L. M. Freeman.

Inventor:
C. H. Curtis
By L. B. Coupland & Co.
Attys.

(No Model.) 5 Sheets—Sheet 2.

C. H. CURTIS.
FRUIT SIZER AND GRADER.

No. 439,932. Patented Nov. 4, 1890.

Witnesses:
Chas. E. Gaylord.
L. M. Freeman.

Inventor:
C. H. Curtis.
By L. B. Coupland & Co.
Attys.

(No Model.) 5 Sheets—Sheet 3.
C. H. CURTIS.
FRUIT SIZER AND GRADER.
No. 439,932. Patented Nov. 4, 1890.
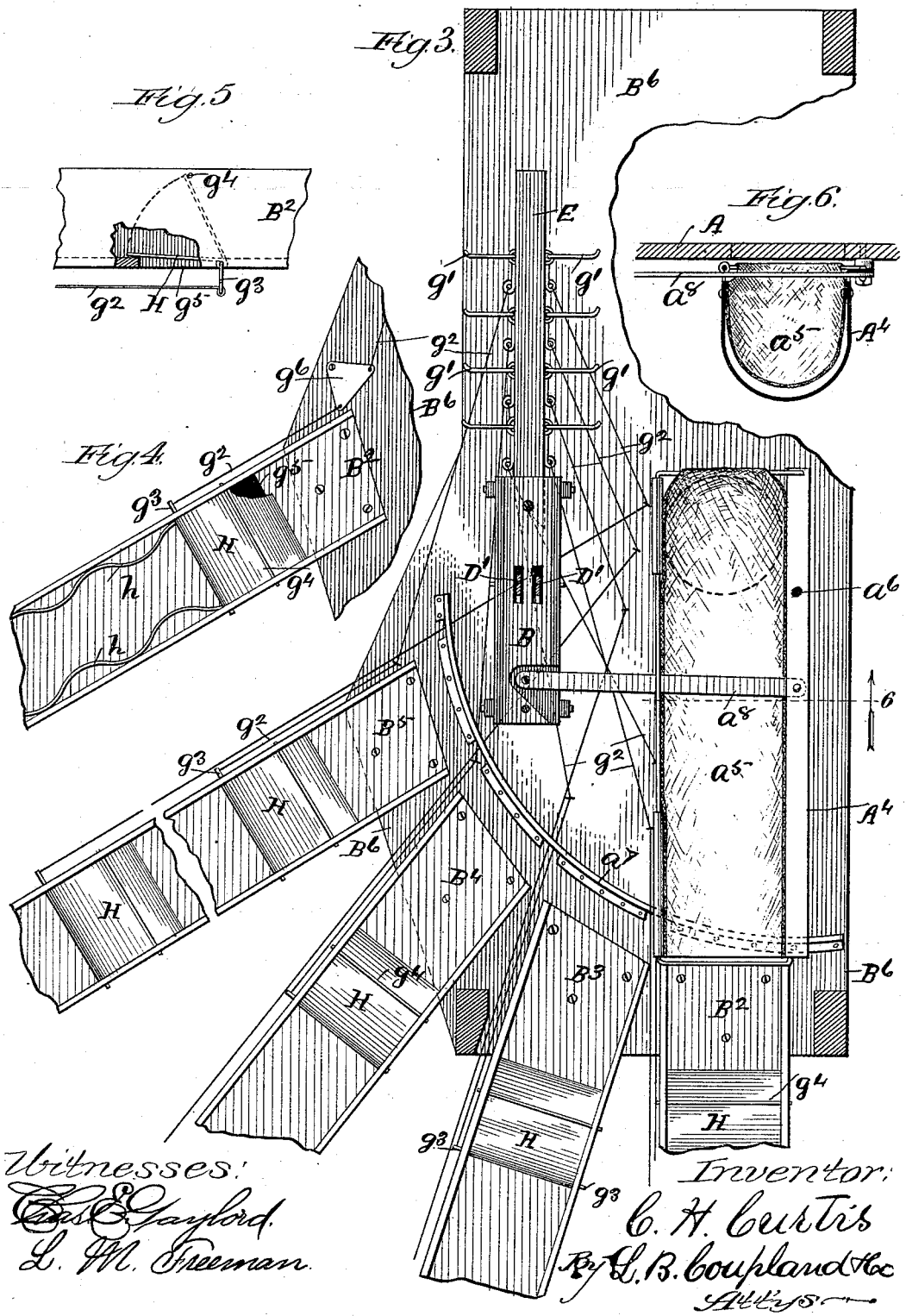
Witnesses:
Chas. B. Gaylord.
L. M. Freeman.
Inventor:
C. H. Curtis
By L. B. Coupland &c
Attys (No Model.) 5 Sheets—Sheet 4.
C. H. CURTIS.
FRUIT SIZER AND GRADER.
No. 439,932. Patented Nov. 4, 1890.
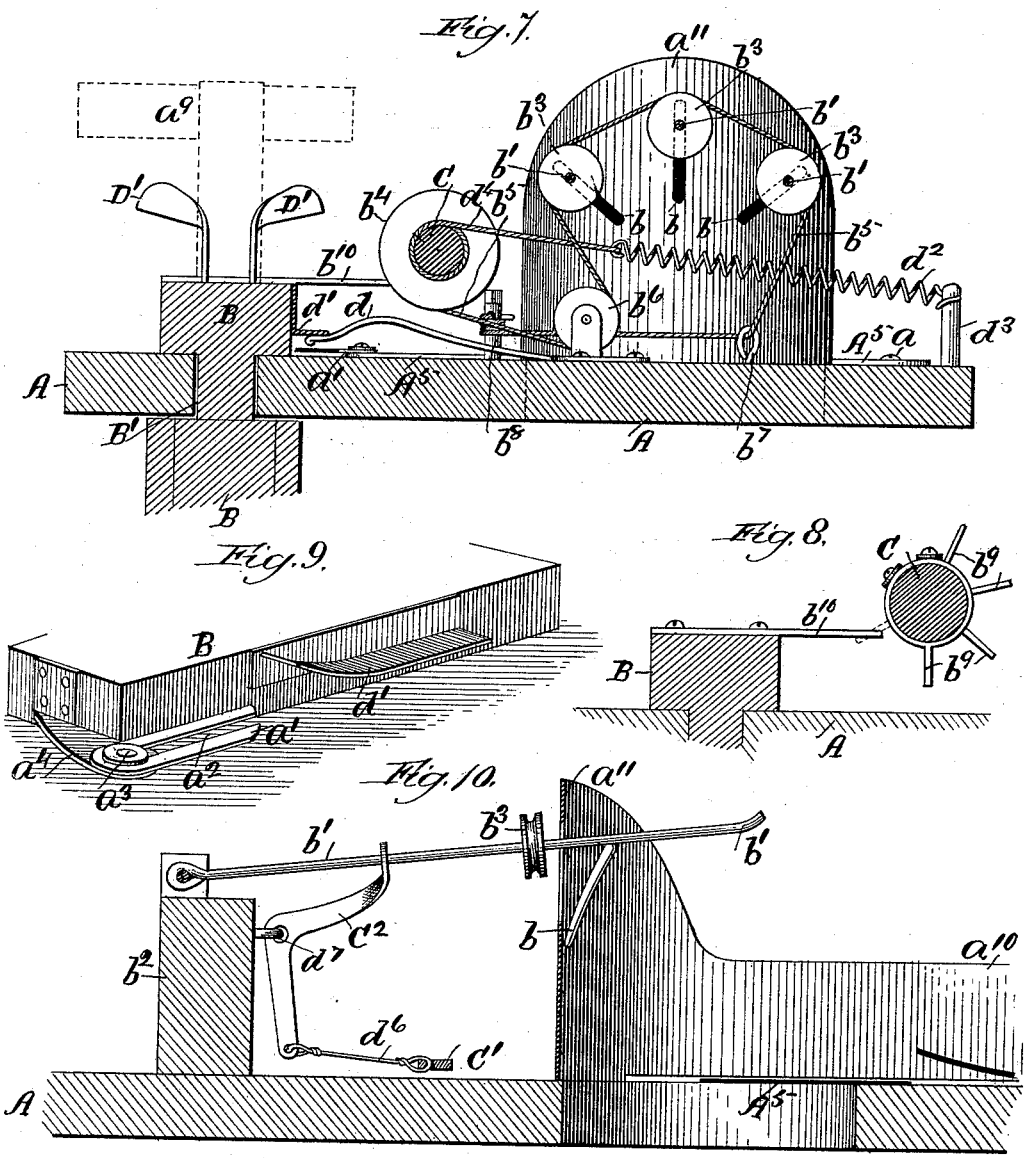
Witnesses:
Chas E Gayford.
L. M. Freeman.
Inventor:
C. H. Curtis.
By L. B. Coupland & Co
Att'ys.

(No Model.) 5 Sheets—Sheet 5.
C. H. CURTIS.
FRUIT SIZER AND GRADER.
No. 439,932. Patented Nov. 4, 1890.
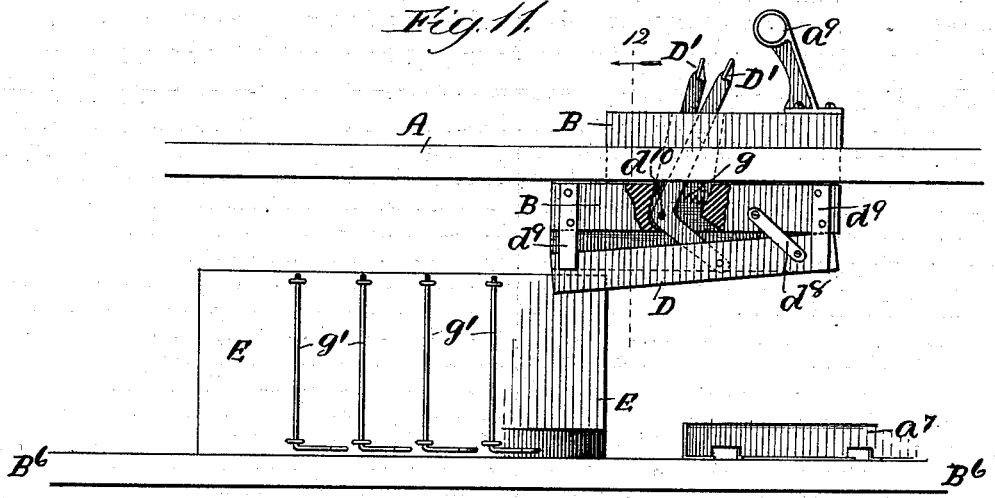
Fig. 11.
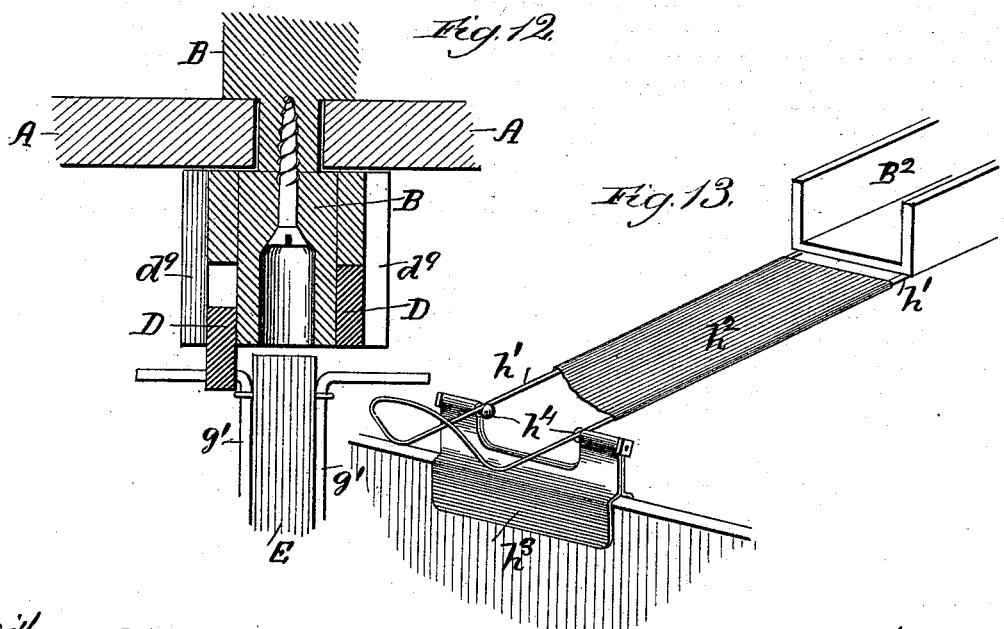
Fig. 12.
Fig. 13.
Witnesses:
Chs. E. Gaylord.
L. M. Freeman.
Inventor:
C. H. Curtis.
By L. B. Coupland & Co
Attys.

UNITED STATES PATENT OFFICE.

CHARLES H. CURTIS, OF ASTOR, FLORIDA.

FRUIT SIZER AND GRADER.

SPECIFICATION forming part of Letters Patent No. 439,932, dated November 4, 1890.

Application filed December 26, 1888. Serial No. 294,892. (No model.)

*To all whom it may concern:*

Be it known that I, CHARLES H. CURTIS, a citizen of the United States, residing at Astor, in the county of Lake and State of Florida, have invented certain new and useful Improvements in Fruit Sizers and Graders, of which the following is a full, clear, and exact description, that will enable others to make and use the same, reference being had to the accompanying drawings, forming a part of this specification.

The object of this invention is to provide a device for sizing and grading fruits—such as oranges, lemons, &c.—and other vegetables also, such as tomatoes.

Figure 1:
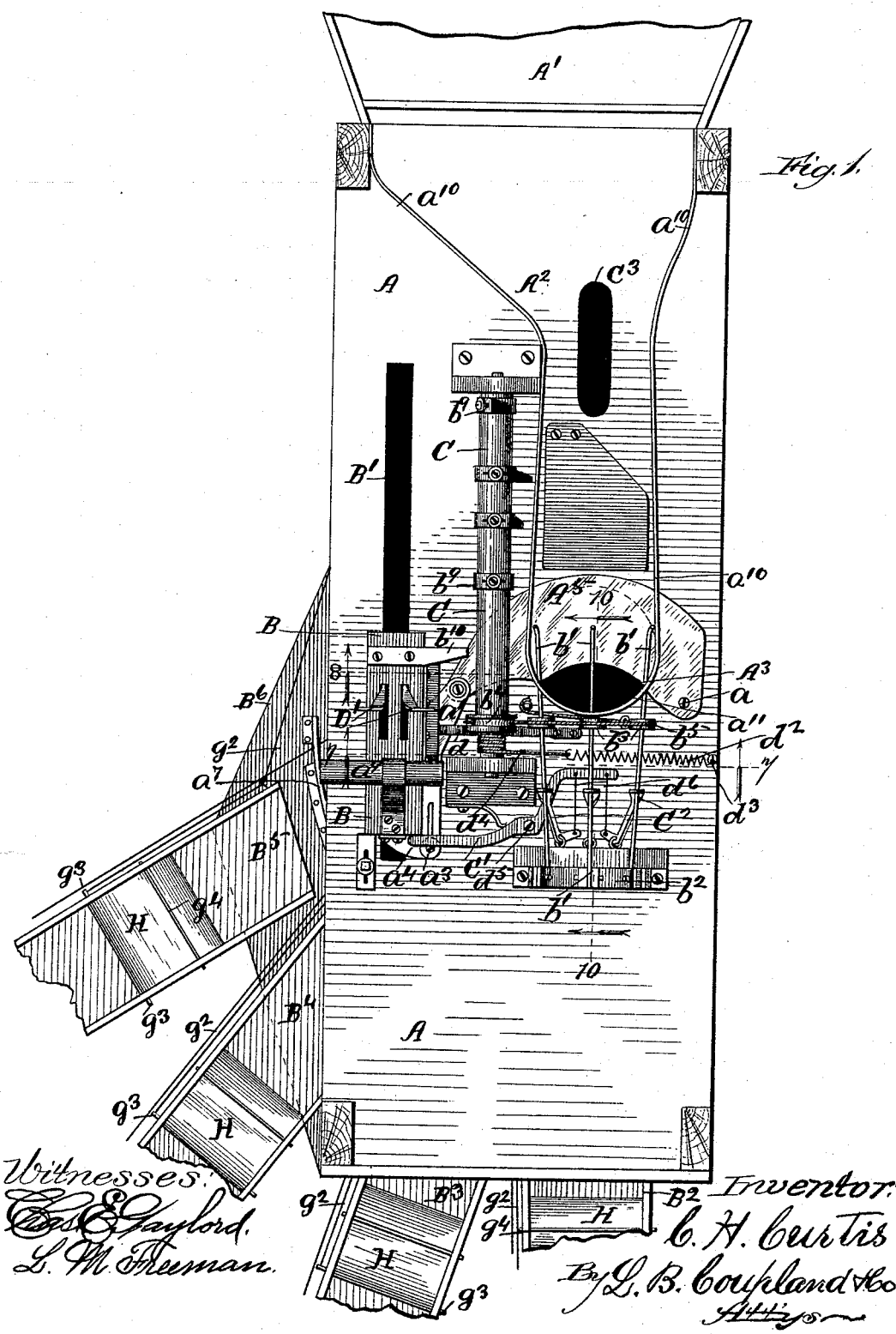
Figure 2:
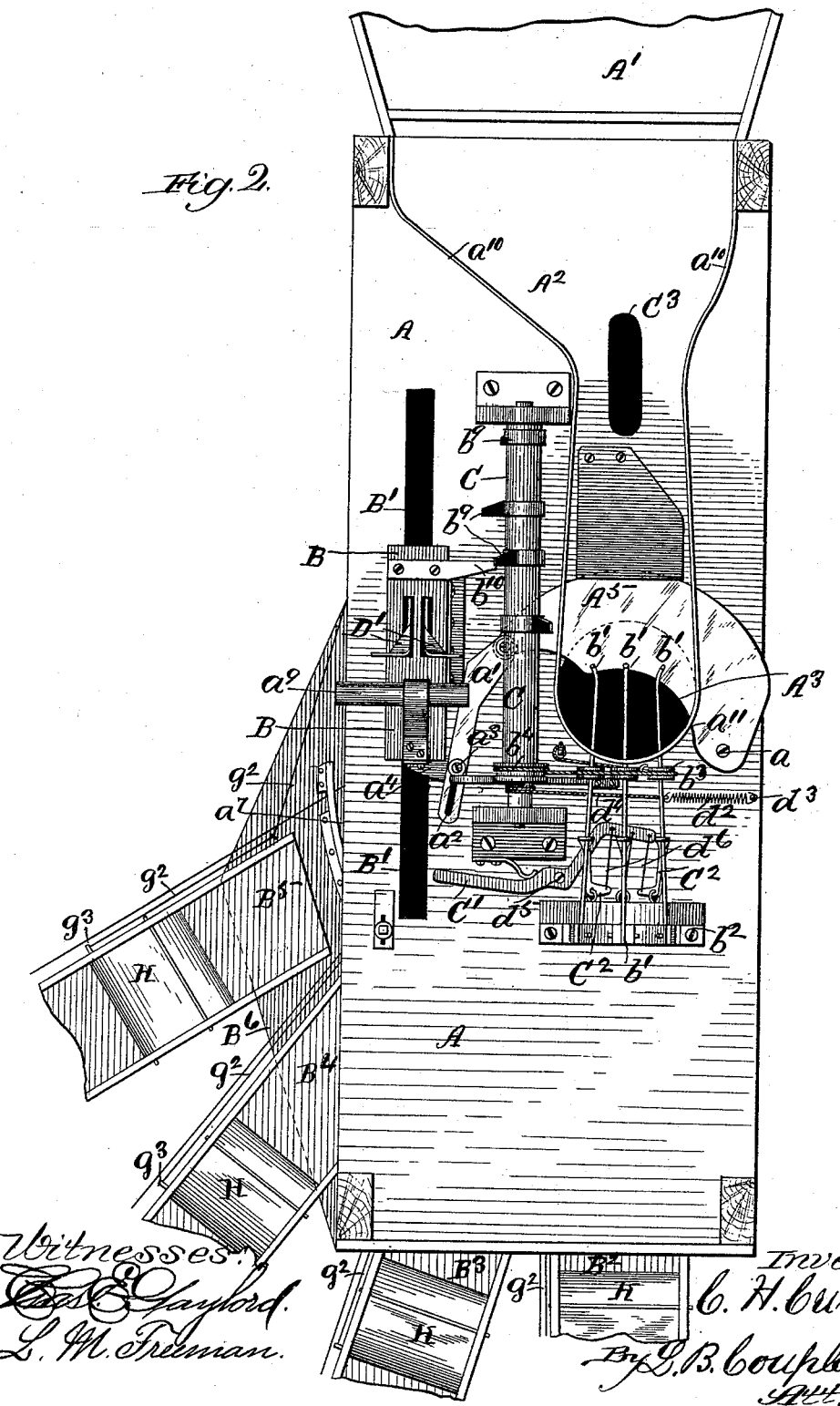

Figure 1 is a plan of a device embodying my improved features and showing the principal working parts in their normal position; Fig. 2, a similar view with the working parts in one of the opposite positions; Fig. 3, a horizontal section and plan just below the table or runway, which is removed; Figs. 4 and 5, detached details; Fig. 6, a transverse section in plane 6, Fig. 3; Fig. 7, a broken-away transverse section in plane 7, Fig. 1; Fig. 8, a transverse section in plane 8, Fig. 1; Fig. 9, a detached detail of construction; Fig. 10, a broken-away vertical longitudinal section in plane 10, Fig. 1; Fig. 11, a broken-away elevation of the front side; Fig. 12, a sectional detail in plane 12, Fig. 11; Fig. 13, a detail of construction.

Referring to the drawings, A represents an inclined table, on the top of which is arranged the greater part of the working mechanism; A', an inclined feed-platform attached to the highest end of the table and properly supported in relation thereto; $A^2$, a contracted runway leading to the aperture $A^3$ in the table, and through which the sized fruit is dropped into the movable distributing-spout $A^4$, located under the table, as shown in Figs. 3 and 6. The size or area of the aperture or opening $A^3$ in the table is regulated by the adjustable cover $A^5$, one end of which is pivoted at $a$, (see Figs. 1 and 2,) the opposite end being pivoted to the inner end of the horizontal lever $a'$. The outer or opposite end of this lever is provided with the elongated slot $a^2$ and engages loosely with the pivot-pin $a^3$, inserted in the lug $a^4$, attached to the slide B, mounted on the table and having an endwise movement in the rectangular opening B'. The slide B and the adjustable cover $A^5$ are shown in their normal position in Fig. 1, the slide traveling the length of the slot $a^2$ in the lever before moving the cover to enlarge the opening in the table through which the fruit is dropped. This feature provides for a slight movement of the cover $A^5$ and a corresponding enlargement of the opening in the table before the distributing-spout $A^4$ is moved, and thus dropping through the fruit of a certain size, which should pass into the first of the series of stationary spouts $B^2 B^3 B^4 B^5$, having the receiving ends secured to the table-shelf $B^6$ under the table, while the opposite or discharge ends terminate with the receptacles receiving the fruit.

The distributing-spout $A^4$ normally registers with the conveyer-spout $B^2$ and is lined with some suitable fabric—such as canvas cloth—forming the sack-receptacle $a^5$, which prevents the fruit from being bruised as it drops through the sizing-table. This distributing-spout is pivoted at $a^6$ (see Fig. 3) to the under side of the table, the front end resting on the curved track $a^7$, secured to the table-shelf $B^6$. One end of the horizontal lever $a^8$ is pivoted to the outer top edge of the distributing-spout, (see Fig. 3,) while the opposite end is secured in a like manner to the slide B just under the table.

By moving the slide B the operator is enabled to bring the discharge end of the distributing-spout into line with any one of the series of conveyer-spouts that may be desired and in accordance with the size of the fruit, each of the series of spouts receiving fruit of a different size. The slide is moved back and forth by means of the hand-grasp $a^9$, (shown in Figs. 1, 2, and 11,) the position of the same being also indicated by dotted lines in Fig. 7.

The contracted runway on the sizing-table is inclosed or formed by the curbing-strip $a^{10}$, set up edgewise and extending from the front end of the table to and curving around the the sizing-aperture in the table, as shown in Figs. 1 and 2. The part of the strip $a^{10}$ passing around the sizing-aperture is made some-what wider or higher, forming the head $a^{11}$, (see Figs. 7 and 10,) and is provided with elongated slots $b\ b\ b$, through which the sizing-fingers $b'\ b'\ b'$ pass. It will be observed that the central slot is in a vertical plane, while the apertures on either side take a diagonal course. This arrangement provides for the expansion and contraction of the fingers relative to each other. The forward or loose ends of these fingers project over and a little beyond the center of the sizing-aperture. The back ends of the sizing-fingers are pivoted to the bracket $b^2$. On each of these fingers near their longitudinal center is mounted a small sheave $b^3$.

C is a sizing-shaft arranged lengthwise of and just above the sizing-table, and is provided with suitable journal-bearings. A sheave $b^4$ is mounted on this shaft. One end of the cord $b^5$ is secured in the groove of the sheave $b^4$, and then passes down under the guide-sheave $b^6$, (see Fig. 7,) and over the three companion sheaves on the sizing-fingers, next down through the eyebolt $b^7$, and permanently fastened to the stationary post $b^8$. Now as the sizing-shaft is rotated in one direction the cord is wound up and the sizing-fingers are contracted and brought in contact with the fruit. Each finger, being independent of the other, will touch the fruit no matter whether it is round, oval, or flat, and giving as many different diameters as there are fingers, thus also giving an approximate area of its surface, this measurement being in turn transmitted to the sizing-shaft C, as will now be described.

Rigidly mounted on the shaft C and arranged spirally thereon are a number of stops or indicators $b^9$. These stops are placed at intervals, each one indicating a different size as measured by the sizing-fingers. The stop-bar $b^{10}$ is secured to the upper side and end of the slide B (see Figs. 1, 2, 7, and 8) and projects therefrom toward the sizing-shaft and engages with the different stops $b^9$ as the slide is drawn toward the feed end of the table. The normal position of the sizing-fingers is outspread, and the passage to the same is just wide enough for a single row of fruit. If the first orange under the sizing-fingers is of a small size, then the bar $b^{10}$ will come in contact with the first stop on the shaft C, which must be rotated to contract the fingers and bring them in contact with the fruit. The next larger size would bring the second stop on the shaft C in position to stop the slide B, and so on. The stops on the sizing-shaft C, being set in accordance with the contraction and expansion of the sizing-fingers, will be stopped by the right one in accordance with the size of the fruit, the movement of the slide B controlling the movement of the cover over the opening in the sizing-table through which the sized fruit is dropped. The swinging distributing-spout is also moved at the same time by the slide B and caused to register with the particular conveyer-spout for that size.

One end of the flat spring $d$ (see Fig. 7) is rigidly attached to the sizing-table and runs along underneath the sheave $b^4$ on the sizing-shaft, and normally has frictional contact with said sheave and serves as a brake to prevent the shaft C from running back when being rotated to contract the sizing-fingers. The loose end of the spring $d$ terminates close to the inner side of the slide B. To the inner side of this slide (see Fig. 9) is attached the finger $d'$, which compresses the spring $d$ when the slide B is returned to a normal position and throws it out of contact with the under side of the sheave $b^4$, when the shaft C will be returned to a normal position by means of the spiral spring $d^2$, one end of which is attached to the post $d^3$ and the other end to the cord $d^4$, coiled around the sizing-shaft C, as shown in Fig. 7.

The horizontal angular lever C' is pivoted near its longitudinal center $d^5$ to the top of the sizing-table. (See Figs. 1, 2, and 10.) The outer end of the lever C' lies in the pathway of the slide B, which comes in contact with this end of the lever just a little before said slide reaches a normal position. The opposite end of the lever C' terminates under the sizing-fingers and is connected to the lower ends of the bell-crank levers $C^2$ (see Fig. 10) by wires $d^6$, the opposite ends of the levers $C^2$ engaging with the sizing-finger, the angle of the levers $C^2$ being secured to the bracket $b^2$ by screw-rings $d^7$. By this means the sizing-fingers are expanded by the contact of the slide B with the end of the lever C'. The elongated aperture $C^3$ provides for the disposal of the fruit which is too small to be passed through the sizer. This arrangement provides for the sizing of the fruit, the grading being done at the same time by the mechanism that will now be described.

To that part of the slide B projecting below the sizing-table and on each side of the same are attached the horizontal bars D D, (see Figs. 3, 11, and 12,) being adjustably secured thereto by means of the links $d^8\ d^8$, the cleats $d^9$ keeping the bars D in their proper relative position. The slide B is slotted for the insertion and movement of the angle-levers D' D', the upper ends of which are within convenient reach of the operator, while the lower ends are connected to the bars D. The levers D' D' are pivoted at their angle $d^{10}$ to the inner side of the slide B, as shown in Fig. 11, the parts being broken away. The spring or springs $g$ serve to hold the levers in their normal position. When the levers are moved from a normal position, one end of the bar or bars D is depressed (see Figs. 11 and 12) so as to engage with the upper end of any desired one of the series of angular rocking-arms $g'$, adjustably secured to the respective sides of the bracket E, (see Figs. 3, 11, and 12,) arranged vertically on the table-shelf B⁶. The upper and lower ends of the rocking-arms $g'g'$ are bent at right angles to the vertical part, but lie in different planes, as shown in Fig. 3. To the lower ends of the rocking-arms is connected one end of the series of wires $g^2$, the opposite end of which is connected to the valve-spindles $g^3$, on which the valve or valves H are mounted and have a pivotal or hinged movement. One or more of the valves or traps H are located in each conveyer-spout and normally remain in a flat or closed position, the movement of the same being illustrated in Fig. 5. The stop-rod $g^4$ prevents the valves from dropping over backward. These trap-valves close or bridge over a corresponding opening $g^5$ in the bottom of the spouts.

The wires connecting the rocker-arms and valves may be run through guides—such as screw-eyes (shown in Fig. 3)—or may have an intermediate connection, such as the triangular plate $g^6$. (Shown in Fig. 4.)

The relative position of the hand-grasp $a^9$ and the levers D' D' enables the operator to manipulate either one of said levers with the thumb and without removing the hand from the handle $a^9$. By this arrangement any of the valves in the spouts may be thrown open and the fruit separated and graded into different lots, there being usually several grades of the same size. Thus the sizing and grading are done at one operation. The grading is done by the operator when passing the fruit into the different runways, one runway receiving the "bright," another the "fancy," a third the "russetts," and so on.

As shown in Fig. 4, the sides of the spouts may be lined with the serpentine strips $h$ to check the run of the fruit and prevent the same from attaining too great a speed and being bruised or injured from dropping into the final receptacle.

Fig. 13 illustrates a device for easing the drop of the fruit into the receiving-receptacle after the same has been sized and graded. This consists of the wire frame $h'$, covered with canvas cloth $h^2$, a portion of which is broken away, showing the lower end of the wire frame turned upward a little to check the fruit and to allow it to roll off gently into the receiving-receptacle. The double spring-clamp $h^3$ is secured to the edge of the receptacle receiving the fruit and supports the wire frame between the bolt-heads $h^4$.

I may make such changes in details as practical working may require without departing from the essential features of my invention.

Having thus described my invention, what I claim as new, and desire to secure by Letters Patent, is—

1. In a fruit-sizer, the combination, with the sizing-table having a contracted inclosed runway and provided with an aperture through which the sized fruit is dropped, of an adjustable cover having a pivotal movement over said aperture, the lever $a'$, provided with the slot $a^2$, to which said cover is pivoted, and the slide B, having a longitudinal movement in the rectangular opening B', substantially as and for the purpose set forth.

2. In a fruit-sizer, the combination, with the sizing-table provided with an aperture through which the sized fruit is dropped, of a cover having a pivotal movement over said aperture, the slide B, the lever connecting said cover and slide, the distributing-spout pivoted to the under side of the sizing-table, the horizontal lever $a^8$, connecting said spout and slide, and the curved track on which the distributing-spout is swung, substantially as and for the purpose set forth.

3. In a fruit-sizer, the combination, with the sizing-table provided longitudinally with a rectangular aperture, of the slide moving in said aperture, the distributing-spout pivoted to the under side of said table, the lever connecting said slide and spout, the curved track upon which said spout is swung, the series of conveyer-spouts, and the table-shelf to which the receiving ends of the conveyer-spouts are secured, whereby the fruit is distributed to different receptacles, in accordance with its size, substantially as and for the purpose set forth.

4. In a fruit-sizer, the combination, with the sizing-table, of the curbing-strip forming a contracted runway and provided with the head $a^{11}$, having the slots $b\ b\ b$, the sizing-fingers $b'\ b'\ b'$, loosely resting in said slots, the bracket $b^2$, to which the back ends of said fingers are pivoted, the sheaves $b^3$, mounted on said fingers, the sizing-shaft, the sheave $b^4$, mounted thereon, the cord $b^5$, having one end fastened to the sheave $b^4$, the guide-sheave $b^6$, and the stationary post $b^8$, to which the opposite end of said cord is secured, whereby the rotating of the sizing-shaft contracts the sizing-fingers with reference to each other, substantially as and for the purpose set forth.

5. In a fruit-sizer, the combination, with the slide B, of the stop-bar attached to and projecting laterally therefrom, the sizing-shaft C, the stops or indicators mounted thereon, the sizing-fingers, and the adjusting-cord connecting said shaft and fingers, substantially as and for the purpose set forth.

6. The combination of the sizing-table, the flat spring $d$, the sizing-shaft, the sheave $b^4$, mounted on said shaft, the slide B, the finger $d'$, attached thereto, and the spiral spring $d^2$, substantially as and for the purpose set forth.

7. In a fruit-sizer, the combination of the distributing-spout $A^4$, the slide B, the horizontal lever $a^8$, forming a pivotal connection between said spout and slide, the curbing-strip $a^{10}$, provided with a number of elongated slots, the sizing-fingers, the sizing-shaft C, the cord $b^5$, and the horizontal angular lever C', substantially as and for the purpose set forth.

8. In a fruit sizer and grader, the combination of the sizing-table, the slide B, the horizontal bars D D, adjustably secured thereto, the links $d^8 d^8$, the cleats $d^9$, the levers D' D', pivoted to said slide and bars, the spring $g$, the angular rocking arms $g'$, the bracket E, the table-shelf upon which the same is mounted, the series of wires $g^2$, the valves or traps H, the valve-spindles $g^3$, and the conveyer-spouts, whereby the fruit may be sized and graded into different lots, substantially as and for the purpose set forth.

CHARLES H. CURTIS.

Witnesses:
 J. E. JONES,
 W. A. McALISTER.